C. F. ULRICH.
EXPANDING CHUCK.
APPLICATION FILED APR. 20, 1916.
1,250,532.
Patented Dec. 18, 1917.
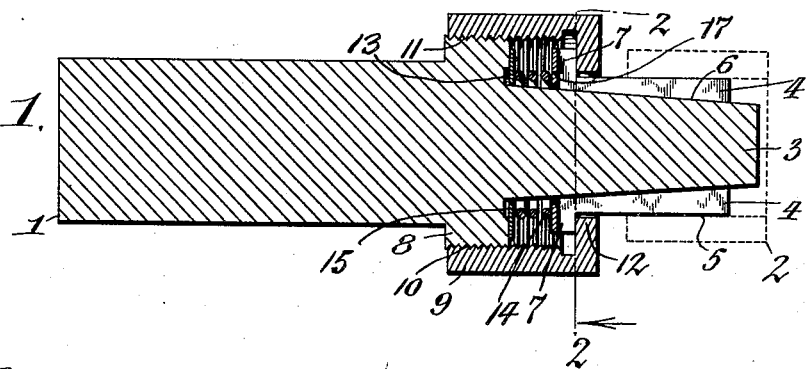
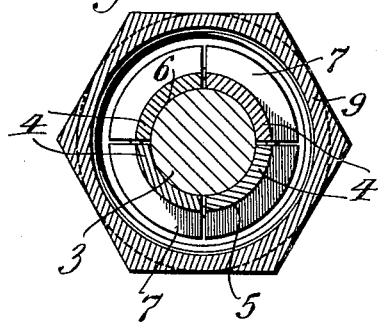
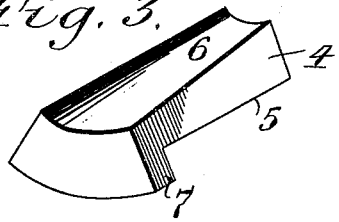
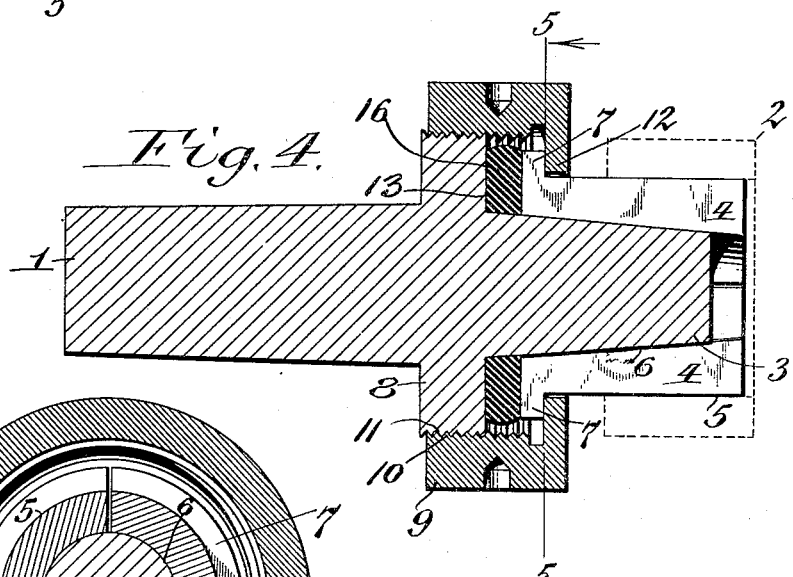
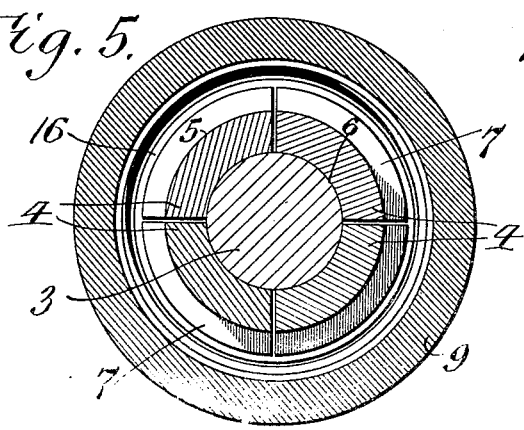
INVENTOR
Carl F. Ulrich
by Geyer & Popp
ATTORNEYS

UNITED STATES PATENT OFFICE.

CARL F. ULRICH, OF BUFFALO, NEW YORK.

EXPANDING CHUCK.

1,250,532.     Specification of Letters Patent.     Patented Dec. 18, 1917.

Application filed April 20, 1916. Serial No. 92,352.

*To all whom it may concern:*

Be it known that I, CARL F. ULRICH, a citizen of the United States, residing at Buffalo, in the county of Erie and State of New York, have invented new and useful Improvements in Expanding Chucks, of which the following is a specification.

This invention relates to an expanding chuck for lathes, milling machines, grinders, &c., that enables a work piece, which is to be turned up, to be gripped from the inside so as to facilitate the operations upon the same.

The object of the invention is to provide a simple and compact chuck that is capable of being readily assembled, which will not, in use, be confusing to manipulate and which can be produced at comparatively low cost.

In the accompanying drawings:

Figure 1 is a longitudinal section of the chuck embodying my invention. Fig. 2 is a vertical transverse section of the same taken on line 2—2, Fig. 1. Fig. 3 is a perspective view of one of the gripping jaws of the same. Fig. 4 is a longitudinal section of a modified form of chuck containing my improvements. Fig. 5 is a vertical transverse section thereof on line 5—5, Fig. 4.

Similar characters of reference indicate corresponding parts throughout the several views.

1 represents the shank or body of the expanding chuck which may be mounted in any suitable manner in the head end of a lathe, or other machines having a rotating member or other support for the same, so that the same may be turned in the usual, customary and well known manner. The dotted lines 2 represent a typical piece of work, which is to be turned up or machined on the rotating chuck. The forward end of the shank 1 is provided with a forwardly tapered or cone-shaped spreader 3 and around the latter are grouped a plurality of clamping or gripping jaws 4 the outer sides 5 of which together form an outer cylindrical surface concentric with the spreader and the inner sides 6 of which together form a conical inner surface. The outer cylindrical surface is adapted to engage with the inner side or bore of the work piece 2 and the inner conical surface is adapted to engage with the tapering surface of the expanding cone or spreader 3. Thus, if the gripping jaws are simultaneously moved longitudinally in either direction their outer faces together constantly form a right cylindrical surface, the diameter of which however varies to conform with the inner diameter of the work piece. Each of the gripping jaws is provided at its rear end with an outwardly projecting lug 7.

Formed on the shank 1 to the rear of and adjacent to the tapered spreader, is an outwardly projecting annular abutment flange or collar 8, whose outer surface is provided with a screw thread. Surrounding this annular flange is a cylindrical shifting sleeve 9, whose bore is provided with a screw thread 10 adapted to engage with the external screw thread 11 formed on the outside of the annular flange 8, so that when said shifting sleeve is rotated either by hand or by some form of wrench, the sleeve is caused to move positively lengthwise of the axis of the shank. Formed on the forward end of the shifting sleeve is an inwardly projecting, annular flange 12 whose rear face is adapted to engage with the forward face of the flanges 7 of the clamping jaws so that when the sleeve is moved longitudinally and rearwardly, the clamping jaws are caused to move likewise, and as they are pulled backwardly along the surface of the tapered spreader, the latter forces them apart.

Interposed between the rear faces of the clamping jaws and a shoulder 13, which is formed on the shank adjacent to the rear end of the tapered spreader, is a helical compression spring 14, which surrounds the tapered spreader and tends constantly to force the clamping jaws forwardly against the annular flange 12 of the shifting sleeve, so that, when said sleeve is moved forwardly, said compression spring causes the clamping jaws to move in the same direction.

A washer 17 is preferably interposed between the front end of this spring 14 and the rear ends of the jaws 4 and it is also preferable to interpose a thin washer 15 between the rear end of the helical spring 14 and said shoulder 13. The diameter of the abutment flange 6 and that of the bore of the threaded part of the clamping sleeve engaging therewith is at least as great and preferably slightly greater than the diameter of the circle formed by the outer ends of the several lugs 5 of the clamping jaws. This permits of constructing the shifting sleeve 7 and its flange 8 in one piece and still permit of compactly assembling the same with the jaws and the shank, thereby materially reducing the number of parts, increasing the strength of the chuck and avoiding derangement of the same while in use.

Where the chuck is to be employed for duplicate or piece work, the latitude of adjustment need not be very great, and in such cases it is sometimes desirable to replace the helical spring by a thick rubber washer 16, as shown in a modified form of the improved chuck, Figs. 4 and 5. However in either form of chuck, it is evident that the construction as a whole is exceedingly simple as it comprises essentially but two separate parts besides whatever number of clamping jaws may be desired. In assembling the chuck, all of the clamping jaws may be inserted into the shifting sleeve from the rear thereof and the latter then screwed into place on the shank, permitting an unskilled machinist to readily replace any fractured part. Further, there is only one nut to turn, so that there can be no confusion as to which particular operation is necessary in putting on or removing a work piece, and the operation cannot be interfered with by any contingency short of mechanical fracture. The work piece may be brought up close to the heavier portion of the shank, thus reducing the spring of the work piece under the cutting tool and also supporting the clamping jaws throughout their entire length in all positions. Furthermore the chuck is compact and strong and can be produced at very low cost.

I claim as my invention:

An expanding chuck comprising a shank provided at its front or outer end with a tapering spreader and in rear of said spreader with a screw threaded portion, a plurality of clamping jaws engaging said spreader and arranged in an annular row around the same and each jaw being provided at its rear end with a laterally projecting lug, and a shifting sleeve provided with an internal flange engaging with the front side of said lugs on the clamping jaws and having a direct screw connection with the threaded part of said shank and all that part of the bore of said sleeve in rear of said lugs being of greater diameter than that of said lugs.

CARL F. ULRICH.